W. H. TAYLOR.
TRUCK.
APPLICATION FILED MAR. 14, 1921.
1,407,235.
Patented Feb. 21, 1922.
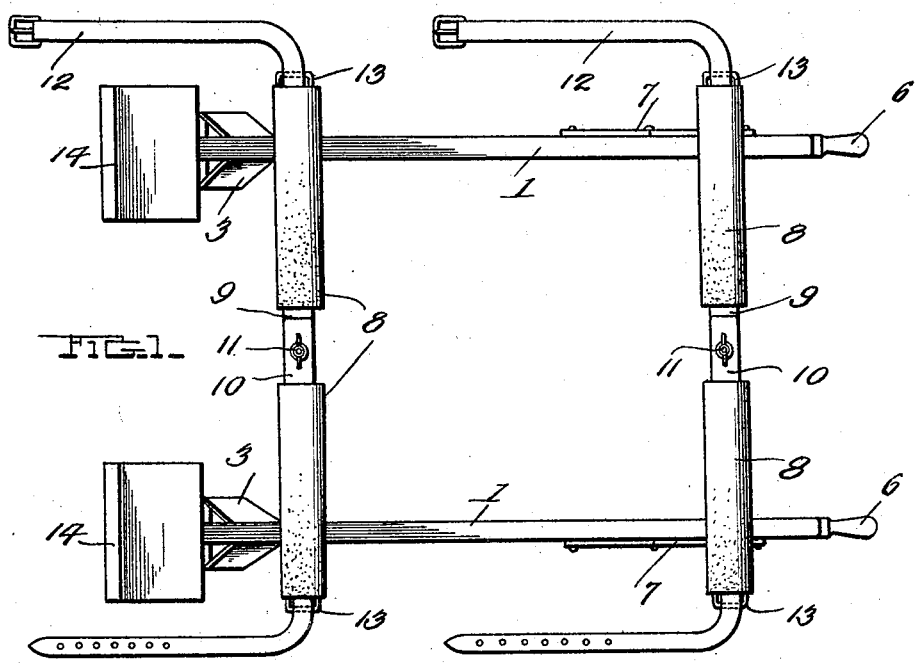
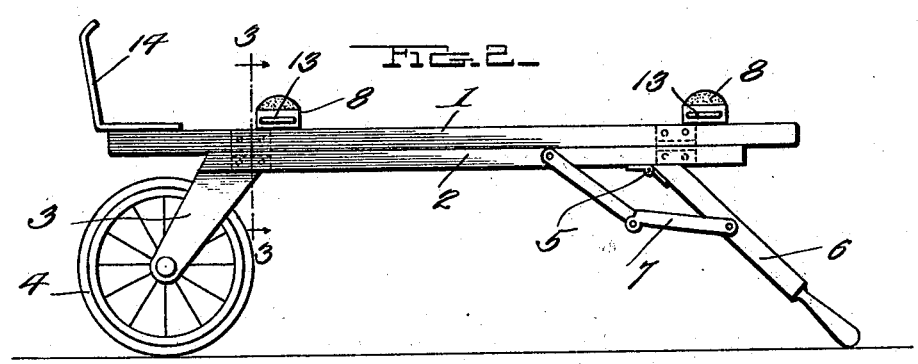
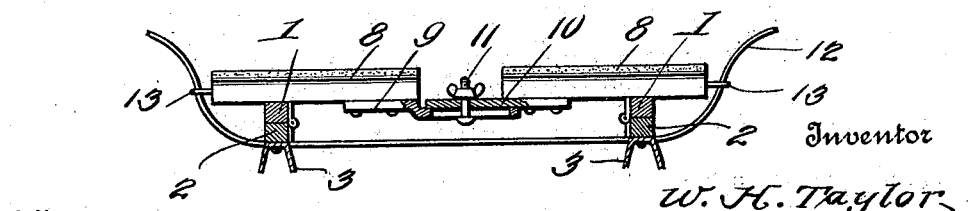
Inventor
W. H. Taylor
Witness
J. R. Pierce
By H. B. Wilson & Co.
Attorneys

UNITED STATES PATENT OFFICE.

WILLIAM H. TAYLOR, OF ANNA, ILLINOIS.

TRUCK.

1,407,235. Specification of Letters Patent. Patented Feb. 21, 1922.

Application filed March 14, 1921. Serial No. 451,969.

*To all whom it may concern:*

Be it known that I, WILLIAM H. TAYLOR, a citizen of the United States, residing at Anna, in the county of Union and State of Illinois, have invented certain new and useful Improvements in Trucks; and I do declare the following to be a full, clear, and exact description of the invention, such as will enable others skilled in the art to which it appertains to make and use the same.

This invention relates broadly to improvements in trucks, having more particular reference to smaller devices of this class known as hand-trucks, the same being especially, although not necessarily, designed for effectively and easily handling phonographs, and being such in construction that a single person will be enabled to handle such devices with ease and with the minimum expenditure of energy.

The principal object of the invention is to generally improve upon trucks of this class by the provision of one of extreme simplicity and durability which is such in construction that it will accommodate and effectively carry phonographs of practically all sizes, due to the fact that it is adjustable in width.

Another and important object of the invention is to provide a truck of this class wherein the wheels and supporting handles are foldable into overlapping relation to render the entire structure extremely compact for shipping and carrying.

A further object of the invention is to provide a novel truck of this class embodying foldable handles which serve the additional function of props, whereby when they are engaged with the ground, the article on the truck will be supported in a truly horizontal position and thus prevented from accidentally slipping off of the truck as might otherwise occur.

Other objects and advantages of the invention will be apparent during the course of the following description.

In the accompanying drawings forming a part of this specification and in which like numerals are employed to designate like parts throughout the same:
Figure 1 is a top plan view of a truck constructed in accordance with this invention.

Figure 2 is a side elevational view thereof, the retaining straps being removed for the sake of clearness.
Figure 3 is a transverse sectional view taken on the plane of the line 3—3 of Fig. 2.

Referring to the drawings, wherein the preferred embodiment of the invention is clearly illustrated, the numerals 1 designate a pair of spaced longitudinal side-rails, to which other bars or rails 2 are hinged, the latter normally abutting the underfaces of said side rails. Secured to the front ends of the bars 2 are forwardly extending forked brackets 3, between the arms of which, wheels 4 are arranged. Hinged at 5 to the opposite ends of these bars, are rearwardly and downwardly inclined handles 6 which are held in operative position by toggle links 7 or any other suitable means. With this construction and arrangement, it will be seen that the handles, wheels, and wheel-brackets may be swung inwardly into overlapping relationship to render the truck compact so that it may be conveniently carried or shipped as the case may be. Furthermore, by making use of the kind of handles shown, the latter may be independently folded against the bars 2 or may be moved to and held in the position disclosed in Fig. 2, where they may be permitted to rest on the ground to serve as props for supporting the truck frame and other parts in a truly horizontal position so as to enable the article to be carried to be easily strapped on the truck and prevented from slipping as would otherwise be the case if the rear or inner end of the side bars rested on the ground so as to throw them into an inclined position. However, it may be stated at this point, that by moving the handles to ineffective or folded position and permitting the frame to rest in a downwardly and inclined position, the phonograph may be easily placed thereon before it is strapped. It may be further stated at this point, that suitable means (not shown) will be employed in actual use to overcome the possibility of the wheels and handles accidentally swinging inwardly to folded position.

In addition to the foregoing parts, the truck includes a plurality of transverse padded rests 8 on which the phonograph is placed, the pads serving to prevent possible injury or scarring of the latter when uncrated and merely wrapped in cloth. It has been before intimated that the truck is adjustable in width to accommodate various sizes of phonographs and other articles. In accomplishing this end, I adjustably connect the inner ends of the rests together as shown in Fig. 3. By referring to this figure, it will be seen that the rests on the left-hand side are equipped on their under faces with slotted brackets 9 and the remaining rests on the other side are equipped with extension plates 10 slidably engaged with said brackets, a clamping bolt 11 being carried by said plates and extending through the slots in said brackets to connect the parts together and permit relative adjustment thereof to increase or decrease the space between the side bars 1. Suitable means such as straps 12 may be employed for retaining the phonograph or other article in position on the truck, these straps being passed through eyes 13 on the ends of the rests 8 as shown. Furthermore, stops 14 of any suitable construction will, as is usual, be secured to the outer ends of the side bars to prevent endwise slipping of the phonograph when the truck is in an inclined position such as it assumes when being rolled from place to place.

When using the truck, it is advisable to break the toggles 7 and swing the handles 6 to ineffective position against the underfaces of the lower side bars 2. Then, rest the inner or rear ends of the side bars on the floor adjacent the phonograph and tilt the latter onto the padded rests 8 as can be easily and conveniently done. Now, lift the inner end of the truck to the horizontal position shown in Fig. 2 and move the handles to the position there shown so that they will act as props and retain the parts in the truly horizontal position shown. With the truck in this position, the free ends of the straps may be brought around the phonograph and buckled so that the latter will be firmly held in place. Then, as is usual the handles 6 may be grasped and the truck tilted forwardly and rolled to the desired place. Attention is directed to the fact, that the particular construction and arrangement which I employ is extremely advantageous in carrying phonographs to the usual motor trucks and without unstrapping them from the hand trucks, placing the latter and phonographs together in the large shipping truck and afterwards folding the handles and wheels into overlapping relationship so that the trucks will not take up much more room, in fact no more room than is required for the shipment of the phonograph itself. It may also be pointed out that my truck may be placed in an inclined position against the tail-gate of the motor truck and easily lifted into the latter. In carrying out this, and assuming that the hand-truck is leaning against the tail-gate, it will be seen that by grasping the wheels or wheel brackets 3, and elevating this end of the truck, the inclined handles 6 will engage the truck floor and act as slides, permitting truck and phonograph to be slid into the main or motor truck. Hence, it will be seen that a single person may be enabled to easily and readily load and unload phonographs to or from the motor truck with ease and without expending a great amount of energy as is ordinarily necessary and requires the help of an additional man or so. The manner of adjusting the truck to fit various widths of phonographs is thought to be obvious from the construction shown and described, and therefore need not be explained here.

A careful consideration of the foregoing description taken in connection with the accompanying drawings is thought to be sufficient to enable persons skilled in the art to which the invention relates to obtain a clear understanding of the same. Therefore, a more lengthy and detailed description is deemed unnecessary.

Advantageous and effective results are practically insured with the construction and arrangement herein as shown and described. Therefore, this construction and arrangement is taken as the preferred embodiment of the invention. However, I wish it to be understood that various minor changes in the shape, size and arrangement of parts may be resorted to without departing from the spirit of the invention or the scope of the subjoined claims.

I claim:

1. A truck of the class described including spaced longitudinal side-bars, stops secured to the upper faces of the latter near the outer ends thereof, foldable brackets carried by the bars, wheels attached to said brackets, and handles pivoted to said bars, said wheels and handles being foldable against the latter to render the structure compact.

2. The structure set forth in claim 1, together with extensible padded rests connecting said side bars together.

3. A truck of the class described comprising spaced longitudinal side bars, additional bars hingedly connected to and abutting the underfaces of said first bars, forked brackets secured to the outer ends of the additional bars, wheels rotatably mounted between the arms of the brackets, downwardly inclined handles hinged to said last named bars, means for holding the handles in operative position, padded transversely disposed alined rests carried by the first named rails, means adjustably connecting the inner ends of the rests, and stops secured to the upper faces of said first named bars near the outer ends of the latter.

In testimony whereof, I have hereunto set my hand.

WILLIAM H. TAYLOR.